Figure 1:
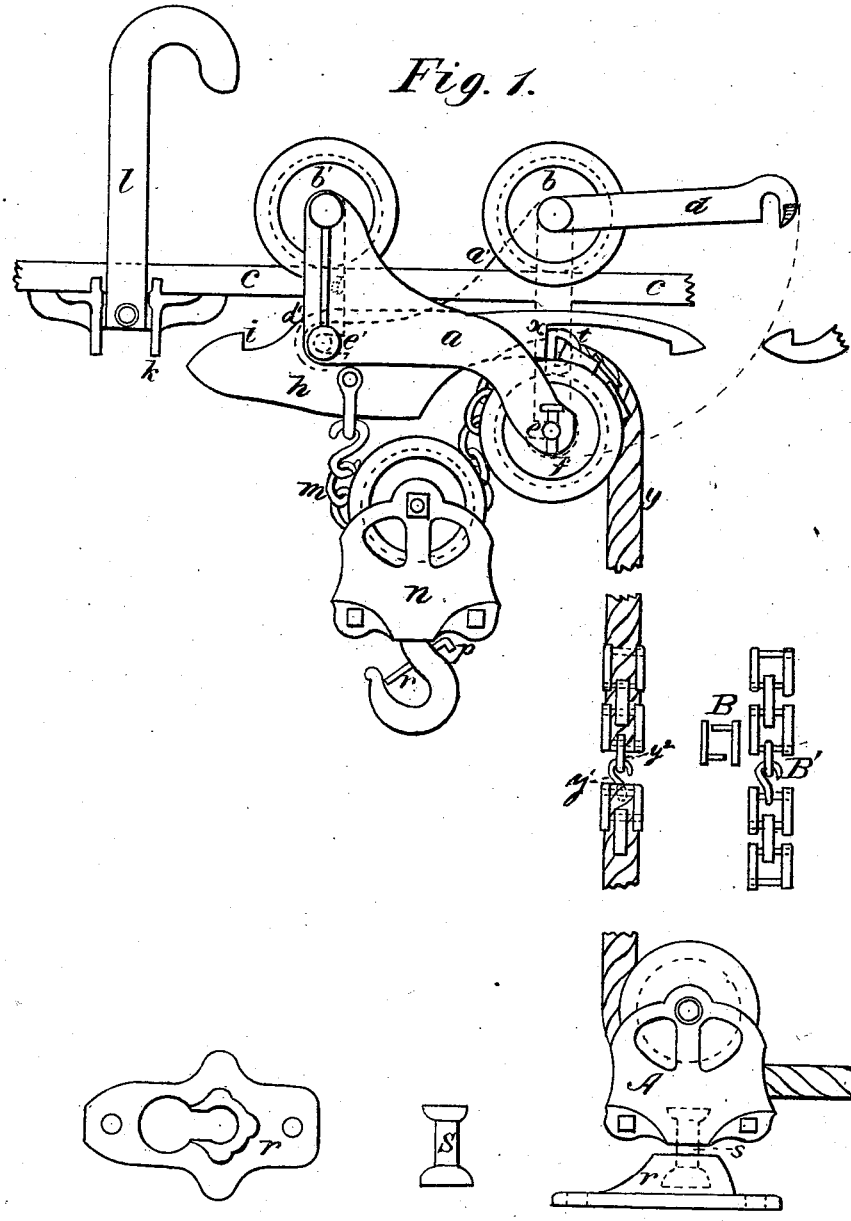

C. S. KERSHAW.
HAY-ELEVATOR.

No. 190,337. Patented May 1, 1877.

Witnesses
J. W. Maxwell
J. Waite

Inventor
C. S. Kershaw
by J. J. Greenough.

UNITED STATES PATENT OFFICE.

CHARLES S. KERSHAW, OF SHERBURNE, NEW YORK.

IMPROVEMENT IN HAY-ELEVATORS.

Specification forming part of Letters Patent No. 190,337, dated May 1, 1877; application filed February 17, 1877.

*To all whom it may concern:*

Be it known that I, CHARLES S. KERSHAW, of Sherburne, Chenango county, State of New York, have invented certain Machinery for Elevating Hay and other articles, part of which is applicable to other purposes, of which the following is a specification:

My invention consists in the construction of the elevator-carriage so as to be readily removed from the suspension-rod on which it traverses without taking it apart, and in the catch or hook by which the carriage is held when raising or lowering the load; also, in the attachment of the ropes and in the fastening of the lower pulley, by which I form a cheap, simple, durable, and convenient hay-elevator for practical use.

The construction is as follows, referring to the accompanying drawing, showing a side elevation, Figure 1, and certain detached details.

The frame consists of two irregular triangular-formed side pieces, $a\ a'$, one on each side and reversed in position. At the upper angle of both of these side pieces grooved rollers $b\ b'$ are located, turning on axes or studs projected from the inner faces of the side pieces, to which they are affixed. These rollers $b\ b'$ run on a round suspension-rod, $c$, by which they are supported.

To the opposite ends of the axes of $b\ b'$ bars $d\ d'$ are pivoted, having hooks on their lower ends that hook onto studs below at $e\ e'$. These studs extend across from one side piece to the other and connect them firmly together, and project far enough beyond to receive the hooks on $d\ d'$ and pins which secure the hooks in place. On the stud $c$ there is a pulley-sheave, $f$, pivoted. (In the drawing the hook $d$ is unhooked and turned away to show the parts concealed by it when in place, as indicated by dotted lines.) Upon the other lower stud, $e'$, a horizontal lever, $h$, is pivoted, that projects beyond the carriage at both ends. At the end $i$ there is a hook on the upper side that is made to catch onto the stop-piece $k$, affixed to the suspension-rod $c$ by a hook, $l$, the lower end of which is bifurcated and embraces the rod $c$ and stop-piece $k$, by which they are severally united. The hook $l$ is suspended above and allows the rod and stop to sway to one side when drawn upon laterally.

The other end of lever $h$ has a hook on the under side made to hook onto a fixture prepared therefor. A chain, $m$, is attached to lever $h$ just inside its fulcrum, and the end of the lever passes over pulley $f$. The chain descends down around the sheave of loose pulley-block $n$, and thence up over pulley $b$. This chain has a swivel, $t$, at its end, that is attached to the end of a rope, Y, by means of a flexible-jointed fastening, consisting of a series of interlocking clamps, the parts of which are L-shaped, as seen detached at B. These lock together by their shorter limbs passing through holes in the longer limbs after being driven through the rope. The first joint locks with the swivel. The second is put through the rope at right angles to the first, and interlocks with it. The third, in like manner, locks with the second, and so on to any desired number, making a secure and flexible coupling of the rope that will run freely through the pulleys. To accommodate the length of the rope to long and short hoists, it is made in two parts, united by a hook, $y^1$, and ring or eye, $y^2$, attached to the ends of the rope by fastenings, shown at B. Directly over pulley $f$ there is a catch formed on the lever $h$ that catches and holds the swivel $t$ or other projection on the chain, and holds the loose pulley-block from running down. To release the lever from the hooks and stops the pulley block $n$ is drawn chock up to the lever, so as to raise it. When the pulley-block recedes, the lever falls back to place. The block $n$ has a swivel-hook in it, through the shank of which a straight pin, $p$, passes in an angular direction, to prevent its unlocking. This is a simple device, readily made and easily worked. There is a foot-block, A, through which the rope is run. It is held down to the floor by means of a foot-piece, $r$, screwed to the floor, and having a socket therein, as clearly seen in the detached plan. There is a swivel-pin, $s$, in the block, (represented separately at $s$, and by dotted lines in the block A,) the lower end of which is the segment of a sphere, which slips into the socket in foot-piece $r$, and the pulley is so held thereby as to readily turn and incline in any direction. It is obvious that this pulley-block A may be otherwise connected with the foot-piece by well-known mechanical means, although I deem the above-described the best.

Having thus fully described my improvements, I claim—

1. The carriage constructed and arranged as herein described, having detaching-hooks centered on the journals of the grooved rollers $b$ $b'$, forming bearings thereof, and hooking onto the studs $e$ $e'$, as and for the purposes specified.

2. The hook-fastening $p$, consisting of a straight bolt passing diagonally through the shank of the hook to close its throat, as above specified.

3. The flexible shackles or fastenings B for the rope-splicing, constructed and affixed as herein described.

4. The slotted foot-piece $r$, constructed as described, and the spherical-headed swivel-pin $s$, for connecting therewith the block A, combined and arranged as and for the purpose specified.

5. The stop-piece $k$ combined with the rod $c$, and hook $l$ for supporting it, substantially in the manner and for the purpose described.

CHARLES S. KERSHAW.

Witnesses:
J. J. GREENOUGH,
FRED. HOWARD.